Sept. 20, 1966  H. E. CLARK  3,273,999
IMAGE DEFORMATION UTILIZING A PRISM
Filed July 2, 1962

INVENTOR.
HAROLD E. CLARK
BY Stanley Z. Cole
ATTORNEY

United States Patent Office 3,273,999
Patented Sept. 20, 1966

3,273,999
IMAGE DEFORMATION UTILIZING A PRISM
Harold E. Clark, Penfield, N.Y., assignor to Xerox Corporation, Rochester, N.Y., a corporation of New York
Filed July 2, 1962, Ser. No. 206,991
5 Claims. (Cl. 96—1.1)

This application relates to xerography and more particularly to improved development and projection means and methods.

In xerography an electrostatic latent image may be formed on an insulating surface and may be developed by the selective attraction of finely divided pigmented particles thereto. The developed image may be viewed on the insulating surface or the particles may be transferred in image configuration to another support. The image may be projected by transferring it to a sheet of paper or the like and projecting by conventional opaque projection methods or by transferring to a sheet of glass or the like and employing a conventional transparency projector. Both of these methods have drawbacks. The transparency method requires that the image be transferred and further requires a fairly heavy deposit of pigmented particles in order to achieve adequate density for projection systems. The opaque projection method in addition to requiring transfer does not readily provide bright images because of inherent optical inefficiencies. In a more recently developed method, image transfer is omitted and the image is projected by means of light specularly reflected from the image surface. Vitreous selenium, which is a material commonly used as the image bearing surface, appears black but actually has a specular reflection coefficient of about 25%. This leads to a relatively efficient projection system which does not require image transfer.

In accordance with the present invention, total internal reflection is utilized to achieve further advances in convenience, versatility and optical efficiency over known xerographic projection systems.

Further features, objectives and advantages of the invention will become apparent in connection with the following specification and drawings:

FIGS. 1-A and 1-B illustrate the phenomenon of total internal reflection as utilized in this invention;

Figure 1A:
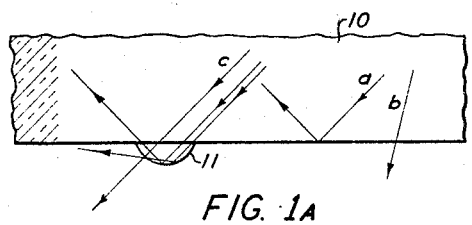
Figure 1B:
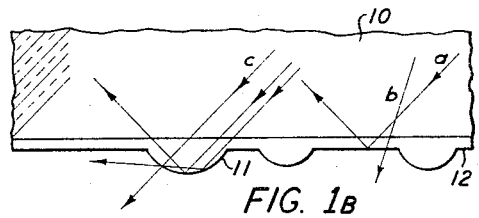

Referring to FIG. 1-A, there is shown a block of transparent material 10, such as glass, having a substantially flat surface, shown as the lower surface. In accordance with known laws of optics, a ray of light traveling in a generally downward direction in transparent material 10 will be totally reflected at the lower surface thereof provided that the sine of the angle made by the ray with a normal to the lower surface is greater than the ratio of the refractive index of the transparent material 10, generally about 1.5, to the refractive index of the material below transparent material 10, which is generally air having a refractive index of 1. Thus, for a material such as ordinary glass, a ray having an angle greater than 42 degrees from a normal to the surface will be reflected by the surface; whereas rays having a lesser angle will pass through the surface. "a" represents a ray which is internally reflected by the surface; whereas "b" represents a ray which passes through the surface. Transparent material 10 illustratively also includes on its lower surface a bump or projection 11. A bundle of rays "c" is shown which has the same angle as ray "a" but is directed toward bump 11 on transparent material 10. As can be seen, a ray striking the very bottom of the bump will be reflected in a manner substantially identical to that of ray "a" but the other rays will either escape through the bump or be deflected by multiple reflections away from the path taken by ray "a."

FIG. 1-B is similar to FIG. 1-A except that the surface of transparent material 10 is coated with a thin layer 12 of a second transparent material such as a plastic layer and which also illustratively contains one or more bumps 11. It can be shown through the applications of Snell's law that the critical angle for total internal reflection (as measured in material 10) is exactly the same for the situation of FIG. 1-B as for FIG. 1-A quite independently of the refractive index of layer 12. Accordingly, the bumps 11 on layer 12 affect the reflection of light in substantially the same way as bump 11 of FIG. 1-A.

Figure 2:
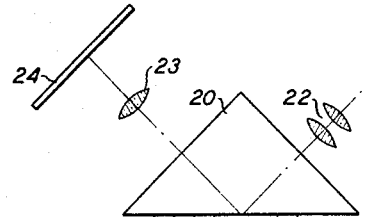
FIG. 2 is a schematic sectional view of a projection system according to this invention.

FIG. 2 shows a projection system employing the principles of total internal reflection. There is included a prism 20 which may be a conventional right angle glass prism, but may also be made of other transparent materials or have somewhat different angles. Light source 21 and condenser 22 project a collimated beam of light into prism 20 and this beam of light is then totally internally reflected from the lower or hypotenuse surface of the prism and focused and projected by a projection lens 23 onto viewing screen 24. The optical arrangement is generally such that lens 22 images light source 21 on lens 23; whereas lens 23 images the lower surface of prism 20 on screen 24. In the absence of any bumps or irregularities on the surface of prism 20, this optical system would simply project uniform illumination to screen 24. If, however, bumps 11 or other irregularities are provided on the lower surface of the prism, they will prevent light from being reflected by the prism into lens 23 and will produce on screen 24 a pattern of dark areas corresponding to the arrangement of the bumps on the prism. There will thus be projected on screen 24 a pattern representative of the surface iregularities on the reflecting surface of prism 20. This projection system is distinguished by its great efficiency which results from the fact that total internal reflection is, as implied by the name, substantially 100% effective. Even allowing for inevitable losses in the collection efficiency of condenser 22 and allowing for miscellaneous absorption and stray reflection in the system, there is nevertheless provided a projection system which makes unusually effective use of the light provided from light source 21 and accordingly provides an unusually brilliant image on screen 24.

Figure 3:
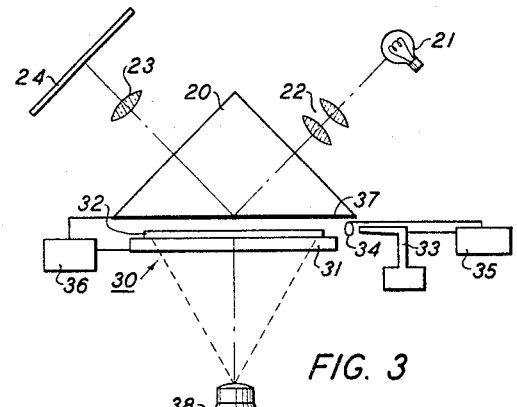
FIG. 3 is a schematic sectional view of image recording and projecting apparatus according to this invention.

FIG. 3 is a schematic sectional view of an image recording and projection apparatus according to the invention. The apparatus of FIG. 3 includes all the elements shown in FIG. 2 together with certain additional ones. In this figure prism 20 is provided on its lower or reflecting surface with a transparent conductive coating 37 such as a transparent tin oxide coating. Positioned opposite this face of the prism and at a uniform small distance therefrom is a xerographic plate 30 which comprises a support member 31 on which is coated a photoconductive insulating layer 32. Support member 31 is preferably transparent and may comprise a sheet of glass incorporating a transparent conductive layer. A bias supply 36 is connected and adapted to apply a control potential between plate 30 and transparent conductive layer 37. An atomizer 33 is positioned and adapted to spray a cloud of liquid droplets between plate 30 and prism 20. A conductive ring 34 is positioned in front of atomizer 33 and connected thereto through a high voltage power supply 35. Elements 34 and 35 operate to electrostatically charge the liquid droplets issuing from atomizer 33. An optical image system 38 is also provided and is adapted to project a pattern of light and shadow onto xerographic plate 30.

In normal operation, plate 30 and more specifically layer 32 thereof is first electrostatically charged in separate conventional apparatus not shown. Plate 30 is then positioned as shown in FIG. 3 and exposed to a pattern of light and shadow by optical image systems 38 to produce an electrostatic latent image thereon as well as a pattern of electric fields in the space between plate 30 and prism 20 which pattern corresponds to the original pattern of light and shadow. Exposure of plate 30 may also be carried out apart from the illustrated apparatus. Atomizer 33 and power supplies 35 and 36 are then energized to spray a cloud of liquid droplets between plate 30 and prism 20 resulting in the deposition on prism 20 of a pattern of droplets corresponding in configuration to the pattern of light and shadow. Power supplies 35 and 36 may be controlled in accordance with known xerographic techniques to produce on prism 20 a pattern of droplets which are either a negative or a positive, in the photographic sense, of the original pattern of light and shadow. Droplets may also deposit on plate 30, but such deposition has no effect on image projection according to this embodiment of the invention. After the pattern of droplets has been formed, light source 21 may be energized to project on screen 24 a brilliant pattern corresponding to the pattern of light and shadow first projected on xerographic plate 30.

It is particularly desirable to use an opaque liquid in atomizer 33 such as ink or other dyed or pigmented liquids. As shown in FIG. 1–A, some of the light entering a transparent droplet from prism 20 will escape from the droplet, but some will be internally reflected by the droplet. Where, however, a light absorptive liquid or a liquid employing light absorptive components is employed, light entering the droplet will be absorbed and therefore substantially none of it can return into the prism. Accordingly, an opaque droplet is more effective in preventing light from lamp 21 from reaching screen 24 than is a transparent droplet, although such may also be employed.

Figure 4:
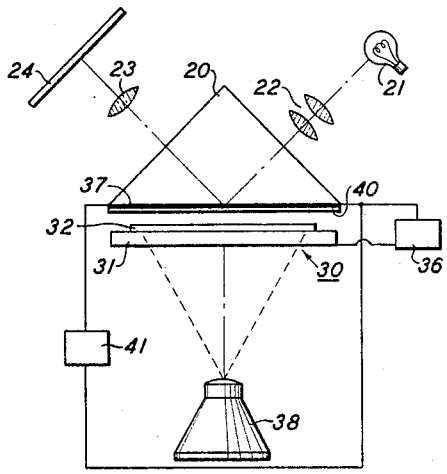
FIG. 4 is a schematic sectional view showing another embodiment of apparatus according to this invention.

FIG. 4 is a schematic sectional view of image recording and projecting apparatus according to the present invention which does not require elements 33–35 of FIG. 3. As shown in FIG. 4, low voltage power supply 41 is connected to opposite ends of transparent conductive coating 37. Transparent insulating layer 40 which will normally be of a thickness not exceeding a few thousandths of an inch is coated over transparent conductive layer 37. In this embodiment transparent insulating layer 40 may comprise a liquid such as oil or the like or may comprise a thermoplastic. Common plastic materials such as styrene resin, acrylic resin, polyethylene resins, cellulose resins, or the like, are suitable. A particularly useful material is Epolene C, a polyethylene resin manufactured by the Eastman Kodak Company.

In operation, it is advisable, although not essential, to apply a uniform electrostatic charge to the exposed surface of layer 40 prior to the use thereof. An electrostatic latent image may be formed on xerographic plate 30 by any of the methods discussed in connection with FIG. 3 and, when the electrostatic image has been formed, plate 30 is positioned closely adjacent to prism 20 as shown.

If a thermoplastic is used for layer 40, power supply 41 is then energized and passes an electric current through transparent conductive layer 37 thereby heating layer 37 as well as layer 40 which is coated thereon. As layer 40 is heated, it becomes softened and is mechanically distorted by the non-uniform electrostatic forces associated with the electrostatic latent image on plate 30. After this distortion has taken place, power supply 41 is de-energized and layer 40 cools and hardens while retaining a distorted surface corresponding to the electrostatic latent image on plate 30. The distorted pattern on layer 40 may then be projected onto screen 24 by energizing light source 21. It should be noted that, while layer 40 must be heated while in the presence of electrostatic latent image on plate 30, it may also be heated sooner, provided only that it is in a softened condition while under the electrostatic influence of plate 30 and is hardened before the electrostatic latent image is removed. A new image may be projected by this apparatus either by removing layer 40 from prism 20 and applying a new layer 40 or by heating layer 40 in the absence of an adjacent electrostatic image to cause the surface on the layer to return to its smooth and level condition. The image forming steps outlined above may then be repeated.

However, if layer 40 comprises a liquid such as oil or the like, power supply 41 need not be energized since heating will not normally be required and layer 40 will be mechanically distorted by the non-uniform electrostatic forces associated with electrostatic latent image on plate 30. As already described, this distorted pattern on layer 40 may then be projected onto screen 24 by energizing light source 21, and a new image may be projected by this apparatus simply by forming a new latent image on plate 30. It has been found that the distortions produced in an oil film by the above methods are quite persistent, provided the film is extremely thin. It is therefore possible to project an image for minutes, or even hours, from such an oil film. However, it may be desirable to project with red or other non-actinic light to avoid disturbing the latent image on plate 30.

Distorted liquid films can also be made completely permanent by using liquids which are capable of being hardened after distortion. Various such liquids exist and are known. For example, methyl methacrylate, styrene, or acrylonitrile monomers may be mixed with small amounts of benzoyl peroxide, acetyl peroxide, or the like to form liquids which are hardenable by heat. Thus, an image may be formed in a film of such liquid as described above and power supply 41 may then be energized to heat layer 37 and thus film 40, thereby initiating polymerization whereby the film will hold its shape indefinitely and may be used for image projection at any subsequent time. Various mixtures of epoxy resins and catalysts may also be used in the same manner. Redox initiated polymerization systems are also known in which a retarder may be added to a polymerizable liquid to delay polymerization for a definite time. A film of such material may be coated on prism 20, and it is then necessary only to distort the film in image configuration before polymerization commences. A further class of liquids is known which comprises photopolymerizable liquids. These liquids generally comprise a monomer, such as an acrylic material, a photo-reducible dye and an electron donor such as EDTA. When using such materials as layer 40, it is necessary only to flood the layer with light after forming an image thereon in order to render the image permanent.

It will be noted, that if layer 40 is itself a deformable photoconductive material, separate xerographic plate 30 may be eliminated from the apparatus shown in FIG. 4. According to this modification, layer 40 instead of layer 32 would be electrostatically charged in separate and conventional apparatus, not shown, and then exposed to a pattern of light and shadow by optical image system 38. As already described, layer 40 would be heated by energizing power supply 41. As a result, layer 40 would become softened and mechanically distorted in image configuration and that distorted pattern could then be projected onto screen 24 in the manner described in connection with the apparatus of FIG. 3.

A deformable photoconductive material suitable for use in the embodiment of the previous paragraph may be made as follows: Mix ten parts by weight of the primarily ultraviolet-sensitive organic photoconductor corresponding to Formula II of Canadian Patent No. 568,707 with ten parts by weight of Vinylite VYNS (Union Carbide), 100 parts by weight diethyl ketone, and .01 part by weight of Rhodamine B, a red water soluble dye available from Du Pont; prepare a solution containing one gram of Staybelite 10 (Hercules Powder Co.) in about 2.4 cc. of toluene. Mix ten parts by volume of this latter solution with one part by volume of the former. The resulting mixture is then wipe-coated on transparent conductive layer 37 and then allowed to dry. Piccolastic A–50 may be substituted for the Staybelite to form a photoconductive layer which will deform at just above room temperature. It is also noted that layer 40 may comprise vitreous selenium.

In a further modification of the invention, the apparatus of either FIG. 3 or FIG. 4 may be employed without the use of external plate charging apparatus. In this modification, xerographic plate 30 is exposed to a pattern of light and shadow while a relatively high potential is maintained between plate 30 and transparent conductive layer 37 by power supply 36. As known in the xerographic art, this results in the formation of an electrostatic latent image on plate 30 without need for pre-charging the plate. It will generally be desirable to lower the potential supplied by power supply 36 before proceeding with image development and projection.

Figure 5:
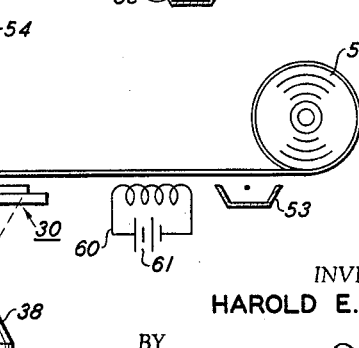
FIG. 5 is a schematic sectional view of image recording and projecting apparatus employing a flexible web of recording material.

FIG. 5 is a schematic sectional view of a form of apparatus according to the invention employing a flexible web of recording material and adapted for repetitive recording and projection. There is provided a web of recording material 50 which is fed from a supply roll 51 to a take-up roll 52. Suitable drive means such as a motor, not shown, may be provided at take-up spool 52 to advance web 50 intermittently or continuously as desired. Web 50 is characterized as being a thin, strong, flexible and transparent material. Polyethylene terephthalate polyester film is particularly suitable, but other plastic materials may be used. For best results, web 50 should also incorporate a transparent conductive layer. Web 50 additionally includes on its lower surface a thin layer of a readily softenable material such as those described in connection with layer 40 in FIG. 4. A corona charging device 53 is positioned to deposit a uniform electrostatic charge on web 50 before the web passes adjacent to xerographic plate 30. An optical imaging system 38 projects a pattern of light and shadow onto xerographic plate 30 and a heating coil 60 together with a power source 61 is positioned to heat and thereby soften web 50 just before it passes into proximity with xerographic plate 30. Heating coil 60 could also be positioned directly opposite plate 30. While adjacent to plate 30, web 50 is deformed in accordance with an image projected by optical imaging system 38 in the same manner already discussed in connection with FIG. 4. The softening effect provided by heating coil 60 positioned as shown is generally sufficiently persistent to permit image formation to take place adjacent to plate 30. Heating coil 60 may also be replaced if desired with a supply of solvent vapor adpated to soften layer 40. Web 50 then advances into contact with the prism 20 and the distorted surface pattern is projected onto a screen 24 by light source 21, condenser 22 and lens 23. A felt wiper 55 is provided to spread a thin film of oil on web 50 to insure good optical contact between the web and prism 20. In the absence of such an oil film, total internal reflection might take place at the interface between prism 20 and web 50 rather than at the exposed surface of web 50 as desired. With this arrangement there is projected on screen 24 a brilliant representation of the pattern on web 50 which in turn correspond to the pattern of light and shadow originally projected on xerographic plate 30. A lamp 54 is also included to uniformly illuminate xerographic plate 30 to effect the erasure of one electrostatic latent image before the formation of another.

The modification described in connection with FIG. 4 may be applied to the apparatus of FIG. 5 and xerographic plate 30 dispensed with by fabricating web 50 from a photoconductive material preferably incorporating a transparent conductive layer. According to this embodiment, certain elements shown in FIG. 5 are repositioned so that successive portons of web 50 are first charged at corona charging device 53 after which a pattern of light and shadow is then projected onto the charged web by optical image system 38. Web 50 then advances into operative proximity with heating coil 60 where it is softened and consequently deformed in image configuration. Projection of the distorted image is then effected in the manner already described.

It will be noted, however, that the apparatus of FIG. 5 inherently produces permanent images on web 50 which accordingly may be rewound and reused at any time in the same way as a strip of conventional film may be reprojected at will. Also, the web may be resoftened and the mechanical distortions will disappear allowing reuse of the web.

The apparatus shown in FIG. 5 may be modified to permit repetitive recording and projection of a pattern of liquid droplets in image configuration formed on web 50 in the manner described in connection with FIG. 3. The modified apparatus would have instead of heating coil 60 elements functionally equivalent to elements 33–35 of FIG. 3. Accordingly, an atomizer such as that corresponding to element 33 of FIG. 3 would be positioned and adapted to spray a cloud of liquid droplets between plate 30 and web 50, and a conductive ring and high voltage power supply corresponding respectively to elements 34 and 35 of FIG. 3 would charge the liquid droplets issuing from the atomizer. After a pattern of liquid droplets in image configuration was formed on web 50, web 50 would be advanced into contact with prism 20 and the pattern of droplets projected onto screen 24 by light source 21, condenser 22 and lens 23.

Figure 6:
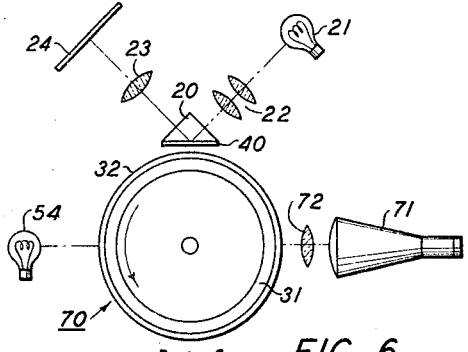
FIG. 6 is a schematic of a form of continuous image formation and projection apparatus according to this invention.

FIG. 6 is a schematic cross-sectional view of a form of continuous image formation and projection apparatus according to the invention. The xerographic plate 70 in this embodiment is of cylindrical form, but again includes a support layer 31 which is cylindrical in form over which is applied a layer 32 of photoconductive insulating material. Plate 70 is adapted to be rotated about its axis in the indicated direction by a conventional motor or the like, not shown. Plate 70 first passes a conventional corona charging device 53 where it receives a uniform electrostatic charge and is then illuminated by a pattern of light and shadow to form an electrostatic latent image. In this illustration the pattern of light and shadow is formed by a cathode ray tube 71, the image of which is focused on plate 70 by a lens 72. Normally, the cathode ray tube beam will be deflected only in a direction normal to the page in the manner customary for facsimile recording and the like. Plate 70 then passes by and in close proximity to a reflecting prism 20 which has a thin transparent film 40 of liquid on its reflecting face. Prism 40 must be relatively small compared to plate 70 in order that all areas of the reflecting surface be reasonably uniformly close to the curved surface of the plate 70. Prism 20 will, however, be as long in a direction normal to the page as is plate 70 itself. The electrostatic latent image on plate 70 will deform the liquid film 40 in the manner already described and as plate 70 slowly revolves about its axis the deformations of film 40 will continuously sweep across prism 20 in synchronism with the motion of the plate. There will thus be projected on screen 24 through the agency of lamp 21, condenser 22 and lens 23 a continuous moving representation of the optical image originally projected onto plate 70 by the cathode ray tube 71. A further lamp 54 is provided near plate 70 at a point subsequent to projection to erase the electrostatic latent image from the plate. This lamp is not always necessary, however, since the most generally used forms of corona charging device 53 will by themselves erase any previous electrostatic latent image.

Variations of the described embodiments, within the scope of the present invention, will occur to those skilled in the art and other xerographic methods may be employed in forming the image at the projection surface. Image systems incorporating electrostatic, photographic or mechanical means may also be employed with characteristic versatility and optical efficiency in the projection systems and devices described. Broad interpretation of the present invention within the spirit of the appended claims is accordingly intended.

What is claimed is:

1. The method of projecting a facsimile of an original image comprising the steps of:
    (a) deforming in a facsimile configuration corresponding to an electrostatic latent image of an original image the interface formed by a substantially flat surface of a transparent medium including a prismatic element and a second medium of a lower index of refraction than said transparent medium;
    (b) directing a beam of light into said transparent medium toward said interface at an angle whereby the pattern of light totally internally reflected by said interface in the absence of said deformation of said interface is altered to produce a reflected light pattern corresponding to said deformation; and
    (c) focusing said altered reflected pattern on a viewing screen.

2. The method of projecting a facsimile of an original image comprising the steps of:
    (a) applying to the interface formed by a transparent conductive coating on a substantially flat surface of a prism and a second medium having a lower index of refraction than said prism opaque liquid droplets in facsimile configuration corresponding to an electrostatic latent image of an original image;
    (b) directing a beam of light into said prism toward said interface at an angle whereby the pattern of light internally reflected by said interface in the absence of said droplets is altered to produce a pattern of reflected light corresponding to said facsimile configuration; and
    (c) focusing said altered pattern of light reflected by said interface of a viewing screen.

3. The method of projecting a facsimile of an original image comprising:
    (a) forming an electrostatic field pattern on a photoconductive insulating layer in response to an original image;
    (b) positioning said photoconductive insulating layer in uniformly closely spaced proximity to an internal reflecting surface of a prism;
    (c) forming a liquid formation on said reflecting surface corresponding to said field pattern, said formation representing a facsimile of said original image;
    (d) directing a beam of light into said prism and toward said reflecting surface at an angle within the range for total internal reflection, whereby the pattern of light internally reflected by said surface in the absence of said formation is altered to produce a pattern of reflected light corresponding to said facsimile; and,
    (e) focusing the light totally internally reflected from said reflecting surface on a viewing screen.

4. The method of projecting a facsimile of an original image comprising:
    (a) forming an electrostatic field pattern on a photoconductive insulating layer corresponding to an original image;
    (b) positioning said photoconductive insulating layer in uniformly closely spaced proximity to an interface formed between a liquid film on a surface of a prism and a second medium of a lower index of refraction than said liquid film whereby said interface is selectively deformed by the electrostatic forces exerted by said photoconductive insulating layer on said liquid film;
    (c) directing a beam of light into said prism and towards said interface at an angle whereby the pattern of light totally internally reflected by said interface in the absence of the deformations of said interface is altered to produce a pattern of reflected light corresponding to said deformations;
    (d) focusing the light totally internally reflected by said interface on a viewing screen.

5. The method of projecting a facsimile of an original image comprising:
    (a) forming an electrostatic field pattern on a photoconductive insulating layer corresponding to an original image;
    (b) positioning said photoconductive insulating layer in uniformly closely spaced proximity to an interface formed between a thin transparent polymerizable liquid film on a surface of a prism and a second medium of a lower index of refraction than said liquid film whereby said interface is selectively deformed by the electrostatic forces exerted by said photoconductive insulating layer on said liquid film;
    (c) polymerizing said liquid film into a solid transparent film;
    (d) directing a beam of light into said prism and towards said interface at an angle whereby the pattern of light totally internally reflected by said interface in the absence of the deformations of said interface is altered to produce a pattern of reflected light corresponding to said deformations;
    (e) focusing the light totally internally reflected by said interface on a viewing screen.

References Cited by the Examiner

UNITED STATES PATENTS

| | | | |
|---|---|---|---|
| 2,050,486 | 8/1936 | Davis et al. | 88—14 |
| 2,239,263 | 4/1941 | Waine et al. | 88—14 |
| 2,824,813 | 2/1958 | Fauser et al. | 96-1 X |
| 2,892,380 | 6/1959 | Baumann et al. | 88—61 |
| 2,896,507 | 7/1959 | Mast et al. | 88—61 |
| 2,943,147 | 6/1960 | Glenn | 178—7.5 |
| 2,985,866 | 5/1961 | Norton | 340—173 |
| 3,055,006 | 9/1962 | Dreyfoos et al. | 96—1 X |
| 3,072,742 | 1/1963 | Block | 96—1 |
| 3,083,623 | 4/1963 | Mott | 95—1.7 |
| 3,138,059 | 6/1964 | White | 95—1.1 X |
| 3,174,414 | 3/1965 | Myer | 88—24 X |
| 3,196,013 | 7/1965 | Walkup | 96—1 |

OTHER REFERENCES

Mott et al.: "Quick Processed Bright Displays by Xerography" Photographic Science and Engineering vol. 5, No. 2, March-April 1961, pp. 87–92.

NORMAN G. TORCHIN, *Primary Examiner.*

A. LIBERMAN, D. D. PRICE, *Assistant Examiners.*